US011646505B2

(12) United States Patent
Adachi et al.

(10) Patent No.: US 11,646,505 B2
(45) Date of Patent: May 9, 2023

(54) COMMUNICATION APPARATUS AND ANTENNA HAVING ELEMENTS DISPOSED ON CURVED SURFACE OF BASE HAVING DOME SHAPE

(71) Applicant: Panasonic Intellectual Property Management Co., Ltd., Osaka (JP)

(72) Inventors: Naoki Adachi, Kanagawa (JP); Takayuki Sotoyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 359 days.

(21) Appl. No.: 16/940,969

(22) Filed: Jul. 28, 2020

(65) Prior Publication Data

US 2021/0036435 A1 Feb. 4, 2021

Related U.S. Application Data

(60) Provisional application No. 62/880,393, filed on Jul. 30, 2019.

(30) Foreign Application Priority Data

Apr. 14, 2020 (JP) .............................. JP2020-072291

(51) Int. Cl.
| | | |
|---|---|---|
| *H01Q 21/20* | (2006.01) | |
| *H01Q 9/04* | (2006.01) | |
| *H04B 7/06* | (2006.01) | |
| *H04B 7/185* | (2006.01) | |
| *H04B 7/19* | (2006.01) | |
| *H01Q 1/52* | (2006.01) | |

(52) U.S. Cl.
CPC .............. *H01Q 21/20* (2013.01); *H01Q 1/523* (2013.01); *H01Q 9/0407* (2013.01); *H04B 7/0617* (2013.01); *H04B 7/18508* (2013.01); *H04B 7/18517* (2013.01); *H04B 7/19* (2013.01)

(58) Field of Classification Search
CPC ......... H01Q 1/52; H01Q 9/0464; H01Q 21/20
See application file for complete search history.

(56) References Cited

U.S. PATENT DOCUMENTS 3,034,121 A * 5/1962 Riblet ...................... H01Q 9/27
  343/908
4,792,808 A * 12/1988 Hildebrand .......... H01Q 21/205
  343/754

(Continued)

FOREIGN PATENT DOCUMENTS

JP 2002-158525 A 5/2002

OTHER PUBLICATIONS

Extended European Search Report dated Jan. 14, 2021 for the related European Patent Application No. 20186215.8, 9 pages.

*Primary Examiner* — Ab Salam Alkassim, Jr.
(74) *Attorney, Agent, or Firm* — Seed IP Law Group LLP (57) ABSTRACT

A communication apparatus includes: an antenna including a base having a dome shape, a first antenna element disposed in a first region including a zenith of the base, and one or more second antenna elements disposed in a second region surrounding the first region; and beam forming circuitry that controls, based on position information of a target satellite to communicate with, a beam formation of the first antenna element and the one or more second antenna elements.

9 Claims, 7 Drawing Sheets

(56) References Cited

U.S. PATENT DOCUMENTS

| | | | | |
|---|---|---|---|---|
| 5,451,973 A * | 9/1995 | Walter | H01Q 1/36 | 343/789 |
| 5,650,788 A * | 7/1997 | Jha | H01Q 21/065 | 343/702 |
| 5,838,284 A * | 11/1998 | Dougherty | H01Q 3/26 | 343/893 |
| 5,919,382 A * | 7/1999 | Qian | H01J 37/32082 | 204/298.34 |
| 6,011,524 A * | 1/2000 | Jervis | H01Q 11/08 | 343/859 |
| 6,291,793 B1 * | 9/2001 | Qian | H01J 37/321 | 219/121.41 |
| 6,292,134 B1 * | 9/2001 | Bondyopadhyay | H01Q 21/205 | 342/374 |
| 6,401,652 B1 * | 6/2002 | Mohn | H01J 37/321 | 118/723 AN |
| 6,646,621 B1 * | 11/2003 | Phelan | H01Q 21/0056 | 343/893 |
| 6,842,157 B2 * | 1/2005 | Phelan | H01Q 21/0087 | 343/893 |
| 6,961,025 B1 * | 11/2005 | Chethik | H01Q 21/064 | 343/705 |
| 7,586,450 B2 * | 9/2009 | Muller | H01Q 1/40 | 343/893 |
| 8,594,735 B2 * | 11/2013 | Huang | H01Q 3/2605 | 455/562.1 |
| 9,000,982 B2 * | 4/2015 | Chethik | H01Q 3/36 | 342/374 |
| 9,620,866 B2 * | 4/2017 | Chang | H01Q 21/205 | |
| 10,665,940 B2 * | 5/2020 | Russell | H01Q 5/40 | |
| 10,847,879 B2 * | 11/2020 | Le-Ngoc | H01Q 21/205 | |
| 11,133,604 B1 * | 9/2021 | West | H01Q 7/00 | |
| 11,245,185 B2 * | 2/2022 | Faler | H01Q 1/42 | |
| 2001/0004000 A1 * | 6/2001 | Qian | H05H 1/46 | 156/184 |
| 2002/0057223 A1 * | 5/2002 | Hook | H01Q 21/064 | 343/893 |
| 2003/0076274 A1 * | 4/2003 | Phelan | H01Q 3/26 | 343/895 |
| 2005/0179596 A1 * | 8/2005 | Higasa | H01Q 5/378 | 343/846 |
| 2010/0328160 A1 * | 12/2010 | Hsu | H01Q 1/521 | 343/700 MS |
| 2012/0007791 A1 * | 1/2012 | Grbic | H01P 11/00 | 343/895 |
| 2018/0006373 A1 * | 1/2018 | Faler | H01Q 3/34 | |
| 2018/0166791 A1 * | 6/2018 | Kim | H01Q 21/30 | |
| 2018/0212327 A1 * | 7/2018 | Tsutsumi | H01Q 17/001 | |
| 2019/0252782 A1 * | 8/2019 | Smith | H01Q 21/205 | |
| 2019/0372218 A1 * | 12/2019 | Vehovc | H01Q 3/267 | |
| 2021/0057817 A1 * | 2/2021 | Lenive | H01Q 3/36 | |

\* cited by examiner

FIG. 1

PRIOR ART

FIG. 2

PRIOR ART

COMMUNICATION APPARATUS AND ANTENNA HAVING ELEMENTS DISPOSED ON CURVED SURFACE OF BASE HAVING DOME SHAPE

CROSS REFERENCE TO RELATED APPLICATIONS

The present application claims the benefit of priority of provisional application 62/880,393 filed on Jul. 30, 2019, the contents all of which are incorporated herein by reference, and the benefit of foreign priority of Japanese patent application 2020-072291 filed on Apr. 14, 2020, the contents all of which are incorporated herein by reference.

BACKGROUND

1. Technical Field

The present disclosure relates to communication apparatuses and antennas.

2. Background Art

Unexamined Japanese Patent Publication No. 2002-158525 discloses a satellite tracking antenna control device capable of accurately tracking a satellite for a long time by controlling an antenna. In the satellite tracking antenna control device disclosed in Unexamined Japanese Patent Publication No. 2002-158525, an attitude of the satellite tracking antenna is mechanically moved to track the satellite.

SUMMARY

Non-limiting exemplary embodiments of the present disclosure contribute to providing a communication apparatus that can appropriately communicate with a plurality of satellites.

A communication apparatus according to one exemplary embodiment of the present disclosure includes: an antenna including a base having a dome shape, a first antenna element disposed in a first region including a zenith of the base, and one or more second antenna elements disposed in a second region of the base; and beam forming circuitry that controls, based on position information of a target satellite to communicate with, a beam formation of the first antenna element and the one or more second antenna elements.

An antenna according to one exemplary embodiment of the present disclosure has a base having a dome shape, a first antenna element disposed in a first region including a zenith of the base, and one or more second antenna elements disposed in a second region of the base.

Note that these comprehensive or specific aspects may be achieved by a system, a device, a method, an integrated circuit, a computer program, or a recording medium, or may be achieved by any combination of the system, the device, the method, he integrated circuit, the computer program, and the recording medium.

One exemplary embodiment of the present disclosure enables appropriate communication with a plurality of satellites.

Further advantages and effects of one exemplary embodiment of the present disclosure will be apparent from the specification and the drawings. Such advantages and/or effects are provided by characteristics described in several exemplary embodiments, the specification, and the drawings, but all the advantages and/or effects do not need to be provided to obtain one or more of the same characteristics.

DETAILED DESCRIPTION OF PREFERRED EMBODIMENTS

Before describing exemplary embodiments of the present disclosure, problems in a conventional technique will be briefly described. A satellite tracking antenna control device of Unexamined Japanese Patent Publication No. 2002-158525, when communicating with a plurality of satellites, changes an attitude of a satellite tracking antenna with respect to each of the plurality of satellites, which may make appropriate communication difficult.

Hereinafter, the exemplary embodiments of the present disclosure will be described in detail with reference to the drawings as necessary. However, an unnecessarily detailed description may be omitted. For example, a detailed description of a well-known item or a redundant description of a substantially identical configuration may be omitted. This is to prevent the following description from being unnecessarily redundant and to facilitate understanding by those skilled in the art.

Note that the attached drawings and the following description are provided for those skilled in the art to fully understand the present disclosure, and are not intended to limit the subject matter as described in the appended claims.

As an antenna device mounted on an aircraft and communicating with a geostationary satellite above the equator, there is known an antenna device that mechanically moves an orientation of a high gain antenna by following positions of the aircraft and the satellite.

Figure 1:
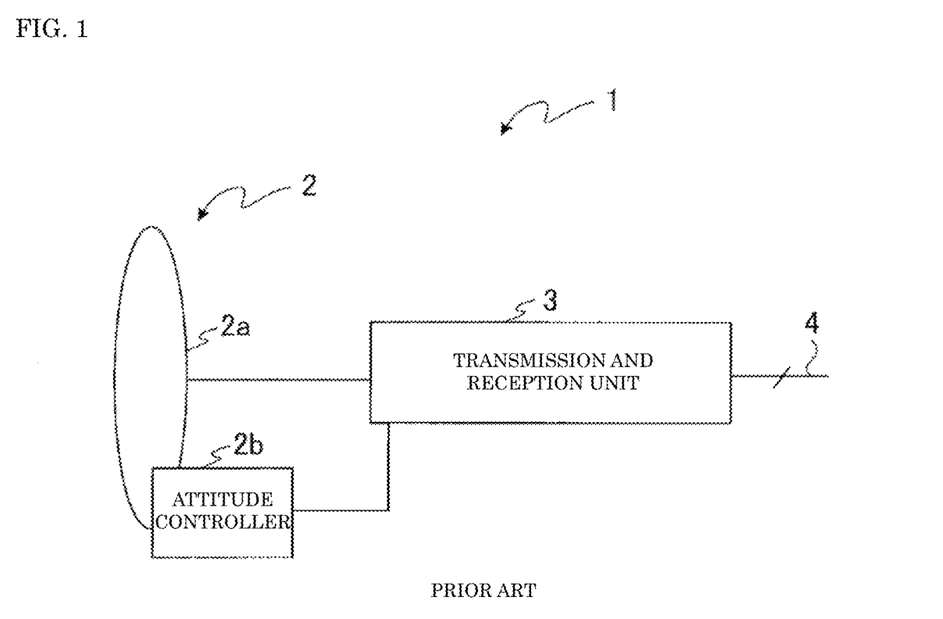
FIG. 1 is a diagram showing one example of functional blocks of a communication apparatus.
Figure 2:
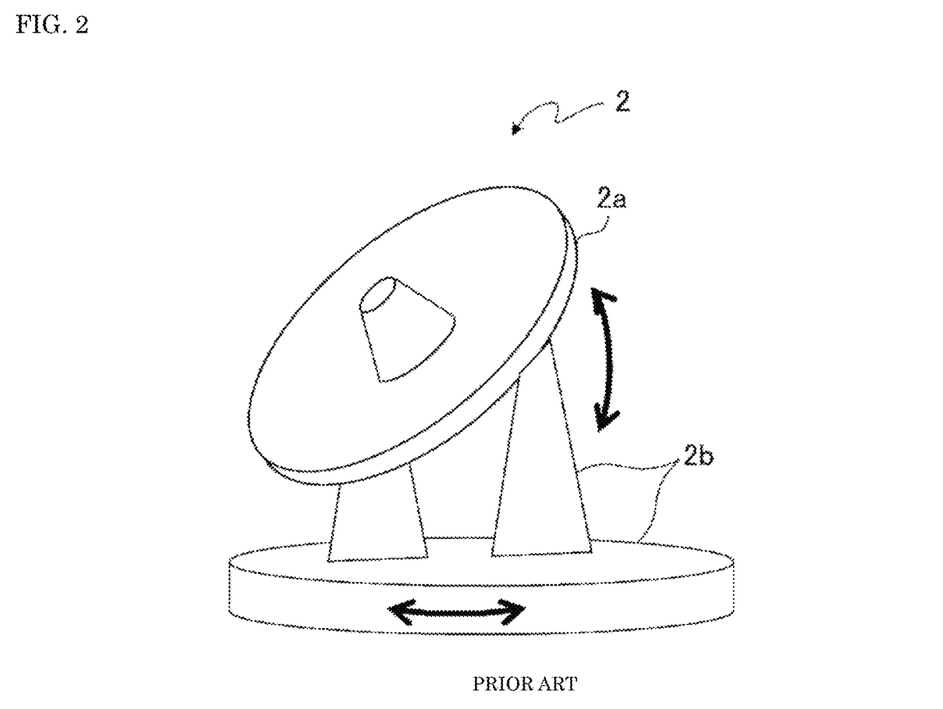
FIG. 2 is a perspective view showing one example of an antenna device included in the communication apparatus of FIG. 1.

FIG. 1 is a diagram showing one example of functional blocks of communication apparatus 1. FIG. 2 is a perspective view showing one example of antenna device 2 included in communication apparatus 1 of FIG. 1. Communication apparatus 1 shown in FIG. 1 is mounted on, for example, an aircraft.

As shown in FIG. 1, communication apparatus 1 includes antenna device 2 and transmission and reception unit 3. Transmission and reception unit 3 communicates with a satellite via antenna device 2. Further, transmission and reception unit 3 is connected to an external network via interface 4 to acquire position information of the aircraft and the satellite.

As shown in FIGS. 1 and 2, antenna device 2 has high gain antenna 2a and attitude controller 2b. High gain antenna 2a outputs a narrow-beam electromagnetic wave toward a satellite to communicate with. Further, high gain antenna 2a receives an electromagnetic wave output from the satellite to communicate with.

Attitude controller 2b mechanically controls (changes) an attitude (orientation) of high gain antenna 2a. Attitude controller 2b, following the positions of the aircraft and the satellite, directs high gain antenna 2a in a direction of the satellite to communicate with. The position of the aircraft may include an attitude of the aircraft.

Examples of satellites for relaying between an aircraft and an earth station include a satellite that orbits in a geostationary orbit (GEO), a satellite that orbits in a medium earth orbit (MEO), and a satellite that orbits in a low earth orbit (LEO). Further, examples of satellites for relaying between an aircraft and an earth station include satellites having different altitudes and/or moving speeds, such as a high-altitude pseudo satellite. Communication apparatus 1 can provide an appropriate network service by communicating with the earth station via a satellite suitable for the route and area of the aircraft.

For example, in order to avoid interference with the adjacent geostationary satellite closely disposed at an interval of a viewing angle of about 1 degree, antenna device 2 mechanically controls an attitude of high gain antenna 2a at a speed that follows a moving speed of the aircraft (relatively lower speed than a moving speed in the LEO or the like in the sky).

However, in communication with a satellite in the LEO or the like that relatively moves at a higher speed, antenna device 2 is required to control the attitude at a higher satellite tracking speed. High gain antenna 2a of antenna device 2 has a large mass in order to obtain a high gain, and has difficulty in controlling the attitude at high speed. Thus, communication apparatus 1 including antenna device 2 may have difficulty in communicating with satellites having different altitudes. Further, communication apparatus 1 including antenna device 2 may have difficulty in communicating with satellites having relative speeds different from a speed of the aircraft (communication apparatus 1).

First Exemplary Embodiment

A communication apparatus described below can appropriately communicate with a plurality of satellites having different altitudes. Further, the communication apparatus can appropriately communicate with a plurality of satellites having different relative speeds.

Figure 3:
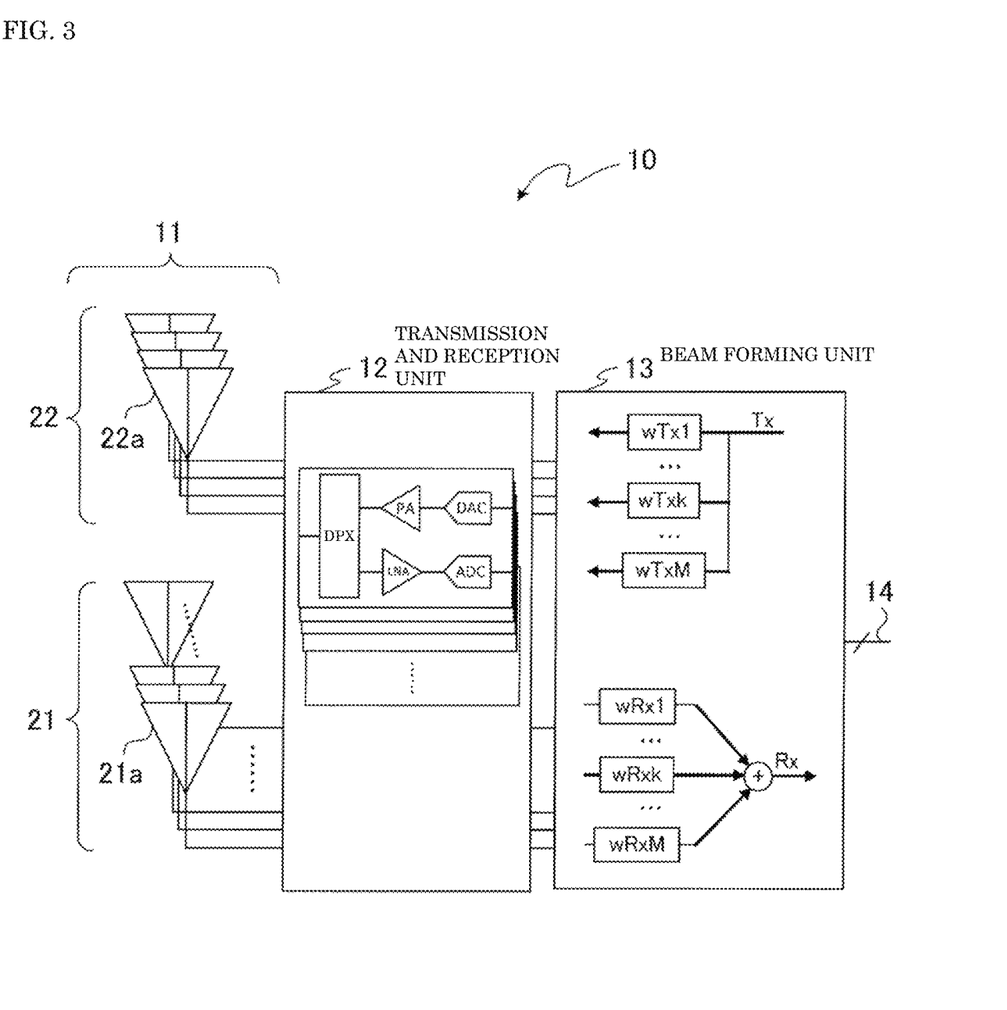
FIG. 3 is a diagram showing one example of functional blocks of a communication apparatus according to a first exemplary embodiment.
Figure 4:
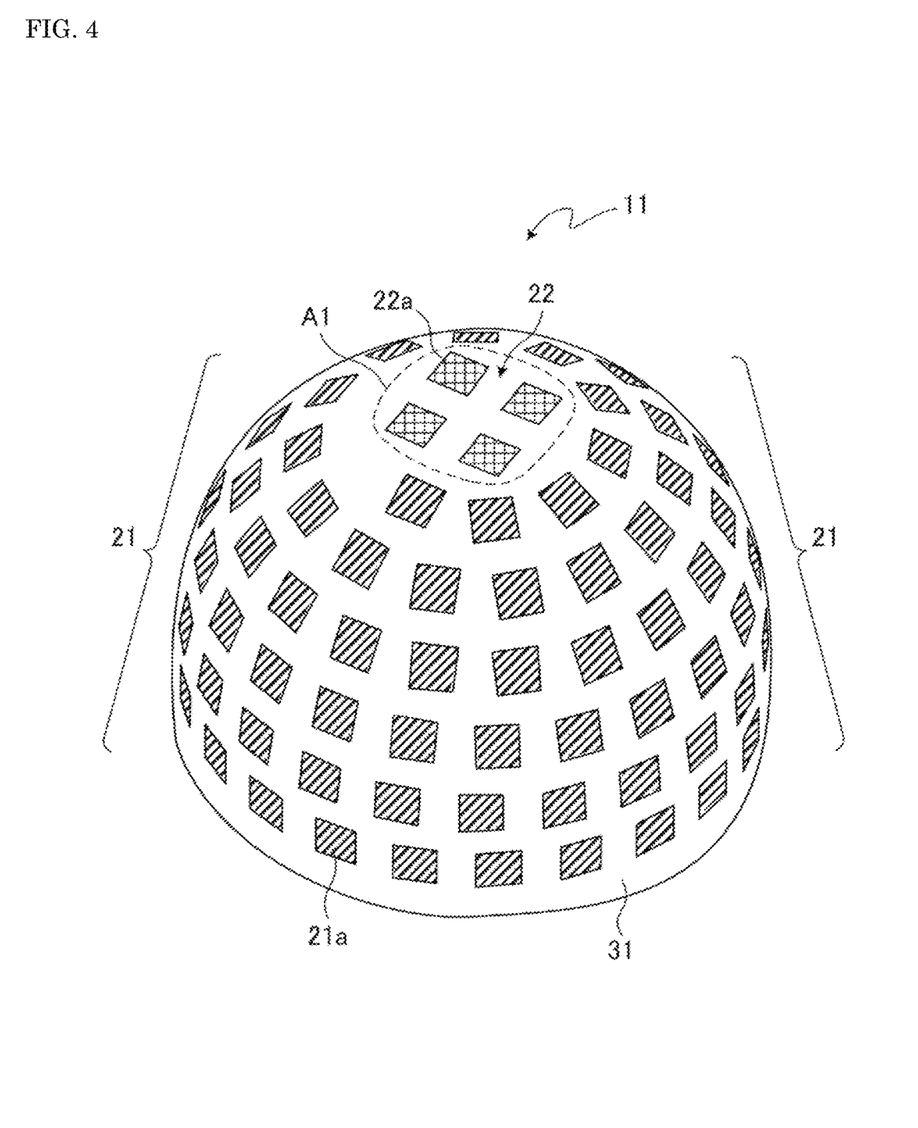
FIG. 4 is a perspective view showing one example of an antenna of the communication apparatus of FIG. 3.

FIG. 3 is a diagram showing one example of functional blocks of communication apparatus 10 according to a first exemplary embodiment. FIG. 4 is a perspective view showing one example of antenna 11 of communication apparatus 10 of FIG. 3.

As shown in FIG. 3, communication apparatus 10 includes antenna 11, transmission and reception unit 12, and beam forming unit (beam forming circuitry) 13.

As shown in FIGS. 3 and 4, antenna 11 has conformal array antenna 21 and zenith array antenna 22. For example, a part outside dotted frame A1 of antenna 11 shown in FIG. 4 indicates conformal array antenna 21. A part within dotted frame A1 indicates zenith array antenna 22. Conformal array antenna 21 has a plurality of antenna elements 21a. Zenith array antenna 22 has a plurality of antenna elements 22a.

As shown in FIG. 4, antenna 11 has base 31 having a dome shape. For example, antenna 11 has base 31 having a hemispherical shape.

Base 31 may be provided, for example, on a body surface in a plan view of the aircraft. In other words, base 31 may be provided on the body surface of the upper part of the aircraft. Base 31 may be a part of a body of the aircraft and antenna elements 21a, 22a may be disposed on the body surface of the aircraft.

Conformal array antenna 21 is configured by arranging the plurality of antenna elements 21a in a region surrounding a region including a zenith of base 31. For example, zenith array antenna 22 is configured by arranging the plurality of antenna elements 21a in a region outside dotted frame A1 in FIG. 4. Conformal array antenna 21 may be regarded as an antenna including a plurality of antenna elements 21a arranged on a curved surface.

Zenith array antenna 22 is configured by arranging a plurality of antenna elements 21a in the region including the zenith of base 31. For example, zenith array antenna 22 is configured by arranging the plurality of antenna elements 21a in a region within dotted frame A1 in FIG. 4. Zenith array antenna 22 may have the plurality of antenna elements 22a arranged on a curved surface or the plurality of antenna elements 21a arranged on a flat surface. In other words, the part within dotted frame A1 of base 31 may be a curved surface (part of a hemispherical surface) or a flat surface.

Antenna elements 21a of conformal array antenna 21 are spirally arranged on a surface of base 31 having a hemispherical shape. For example, where a number of elements is N, antenna elements 21a are disposed at a position where a polar coordinate $(\theta_k, \varphi_k)$ of the k-th element is calculated by a generalized spiral series. Specifically, antenna elements 21a are disposed on the curved surface of base 31 in accordance with the following generalized spiral series formula.

$$h_k = \frac{k-1}{N-1}$$

$$\theta_k = a\cos(h_k)$$

$$\phi_k = \phi_{k-1} + \sqrt{\frac{2\pi}{N}} \frac{1}{\sqrt{1-h_k^2}}$$

Figure 5:
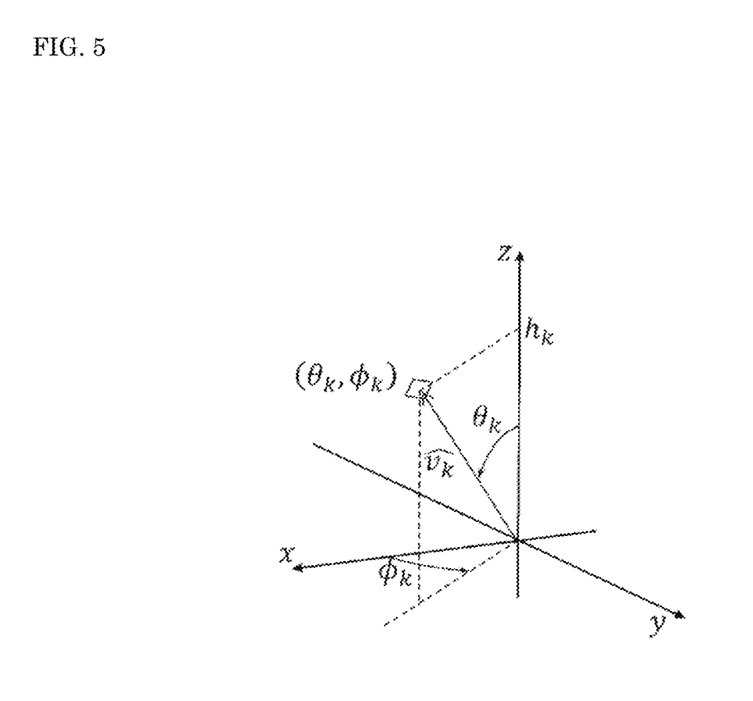
FIG. 5 is a diagram showing an example of a polar coordinate ($\theta_k$, $\varphi_k$) of the k-th element of a conformal array antenna.

FIG. 5 is a diagram showing an example of a polar coordinate $(\theta_k, \varphi_k)$ of the k-th element of conformal array antenna 21. Antenna elements 21a of conformal array antenna 21 are disposed such that element intervals are uniform on the curved surface in accordance with the above generalized spiral series formula. Antenna elements 22a of zenith array antenna 22 are disposed in the region including the zenith of antenna 11 (base 31), and are disposed at element intervals equivalent to element intervals of conformal array antenna 21.

As described above, antenna elements 21a of conformal array antenna 21 are disposed in the region surrounding the region including zenith of base 31 having a hemispherical shape. That is, antenna elements 21a of conformal array antenna 21 are disposed over 360 degrees ($0° \leq \theta_k \leq 360°$) around base 31 in a horizontal direction. This allows antenna 11 to emit a beam in any direction around base 31.

On the other hand, antenna elements 22a of zenith array antenna 22 are disposed in the region including the zenith of base 31 having a hemispherical shape. The zenith of base 31 having a hemispherical shape has a better peripheral view than other parts of base 31. As a result, zenith array antenna 22 of antenna 11 is suitable for forming a broad beam.

FIGS. 3 and 4 will be referred again. Transmission and reception unit 12 shown in FIG. 3 converts a digital signal output from beam forming unit 13 into an analog high frequency signal. Transmission and reception unit 12 amplifies the converted analog high frequency signal to a predetermined power level and outputs the signal to antenna elements 21a, 22a.

For example, transmission and reception unit 12 converts the digital signal output from beam forming unit 13 into a band-limited analog intermediate frequency (IF) signal with a digital-to-analog converter (DAC). Transmission and reception unit 12 converts the analog IF signal into a band-limited signal in a transmission frequency band with an up converter. Transmission and reception unit 12 amplifies the power of the frequency-converted signal with a power amplifier (PA). Transmission and reception unit 12 outputs the power-amplified signal to antenna elements 21a, 22a via a duplexer (DPX). The duplexer is a device for sharing antenna elements 21a, 22a between transmission and reception.

Transmission and reception unit 12 converts reception signals received by antenna elements 21a, 22a into low noise digital signals.

For example, transmission and reception unit 12 band-limits the reception signals received by antenna elements 21a, 22a with the duplexer, and then amplifies the signals with a low noise amplifier (LNA). Transmission and reception unit 12 frequency-converts the amplified reception signals into band-limited analog IF signals with a down converter. Transmission and reception unit 12 converts the analog IF signals into digital signals with an analog-to-digital converter (ADC).

Beam forming unit 13 acquires position information such as coordinates of the aircraft and the satellite from an external network connected via interface 14. The position information of the aircraft may be acquired by using, for example, a global positioning system (GPS). The coordinate of the satellite and other information may be acquired in advance from, for example, a service company that provides the position information of the satellite. The position information of the aircraft may include an attitude of the aircraft.

Beam forming unit 13 forms a beam for the satellite to communicate with. For example, beam forming unit 13, using the acquired position information, calculates a weight having a suitable tracking characteristics for the satellite to communicate with. Beam forming unit 13 gives (multiplies) the calculated weight to a transmission signal transmitted to the satellite and a reception signal received from the satellite.

More specifically, beam forming unit 13 generates a digital signal by giving a weight w_Txk for the k-th antenna element to a transmission baseband signal Tx. Further, beam forming unit 13 gives a weight w_Rxk to the digital signal of the signal received from the satellite, which is output from transmission and reception unit 12, and synthesizes the digital signal to generate a reception baseband signal Rx.

Beam forming unit 13 forms a narrow beam using conformal array antenna 21 for a geostationary satellite, for example. Alternatively, beam forming unit 13 forms a narrow beam for the geostationary satellite, for example, using conformal array antenna 21 and zenith array antenna 22.

Beam forming unit 13 forms a broad beam using zenith array antenna 22 for a satellite in the LEO or the like having a high relative speed. For example, beam forming unit 13 forms a beam having a wider beam width than a narrow beam for the geostationary satellite with respect to a satellite that orbits at a relative speed equal to or higher than a predetermined value. The relative speed may be calculated from the positions of the aircraft and satellite.

Beam forming unit 13 forms a broad beam using zenith array antenna 22 for a satellite having a low altitude, for example. For example, beam forming unit 13 forms a broad beam using zenith array antenna 22 for a satellite having a lower altitude than an altitude of the geostationary satellite.

Beam forming unit 13 may calculate the weight of conformal array antenna 21 that spreads the beam of zenith array antenna 22. For example, beam forming unit 13 may form a broad beam by calculating the weight of conformal array antenna 21 that disperses transmission power of antenna element 22a.

The following formula shows an example of calculation of the weight w_Txk when signals are transmitted from antenna elements 21a, 22a of the k-th element for directivity D ($\theta\_0, \varphi\_0$) for the satellite to communicate with.

$$w_{Txk} \propto \iint D(\theta_0, \phi_0) \exp(jk_0 v_k (\overrightarrow{v\_k} \cdot \hat{R}(\theta_0, \phi_0))) d\theta_0 d\phi_0$$

As described above, antenna 11 of communication apparatus 10 has base 31 having a dome shape, antenna elements 22a (first antenna elements) disposed in a first region including the zenith of base 31 (for example, the area within dotted frame A1 in FIG. 4), and the plurality of antenna elements 21a (second antenna elements) disposed in a second region surrounding the first region (for example, the region outside dotted frame A1 in FIG. 4, a region excluding the first region). Beam forming unit 13 of communication apparatus 10 calculates a weight based on the position information of the satellite to communicate with, and multiplies the signals transmitted and received by the antenna elements 21a and 22a by the weight.

Note that the multiplication of the weight also includes setting one of the first antenna elements or the second antenna elements to 0.

Further, although an example has been described in the present exemplary embodiment where control is done separately for the first region and the second region, control may be done separately for more regions (regions of N).

This allows communication apparatus 10 to appropriately communicate with a plurality of satellites. For example, communication apparatus 10 forms a narrow beam corresponding to the position and attitude of the aircraft for the geostationary satellite and a wide beam for the satellite orbiting in the LEO or the like without moving the antenna to appropriately communicate with the satellites.

Further, communication apparatus 10 can flexibly cope with communication with satellites having different altitudes and relative speeds by controlling beams suitable for satellites to communicate with and adapting to different tracking characteristics for each satellite. For example, communication apparatus 10 can flexibly cope with communication with geostationary satellites and communication with satellites in the LEO, MEO, GEO, and the like.

Further, communication apparatus 10 can simultaneously communicate with a plurality of satellites. For example, communication apparatus 10 can simultaneously communicate with a plurality of satellites by using different beams.

In the above, an example has been shown in which antenna elements 21a of conformal array antenna 21 are disposed in the polar coordinate of the generalized spiral series formula. However, an offset corresponding to, for example, a position where antenna 11 is installed may be added to the polar coordinate.

Electromagnetic waves transmitted and received by antenna 11 may be either linearly polarized waves or circularly polarized waves. Antenna 11 sharing two orthogonal polarized waves can improve communication performance.

Further, in the above description, the number of antenna elements 22a of zenith array antenna 22 is plural, but the number is not limited thereto. The number of antenna elements 22a of zenith array antenna 22 may be one. Communication apparatus 10 may be paraphrased as an antenna device.

Further, although the hemispherical shape is illustrated as one example of the shape of base 31, the shape is not limited thereto. Base 31 may have a vertically long semi-elliptical shape. Base 31 may have a horizontally long semi-elliptical shape. That is, the dome shape of base 31 may include a shape having a zenith and a curved surface such as a hemispherical shape, a vertically long semi-elliptical shape, and a horizontally long semi-elliptical shape.

Second Exemplary Embodiment

The conformal array antenna may have antenna elements on a cylindrical side surface.

Figure 6:
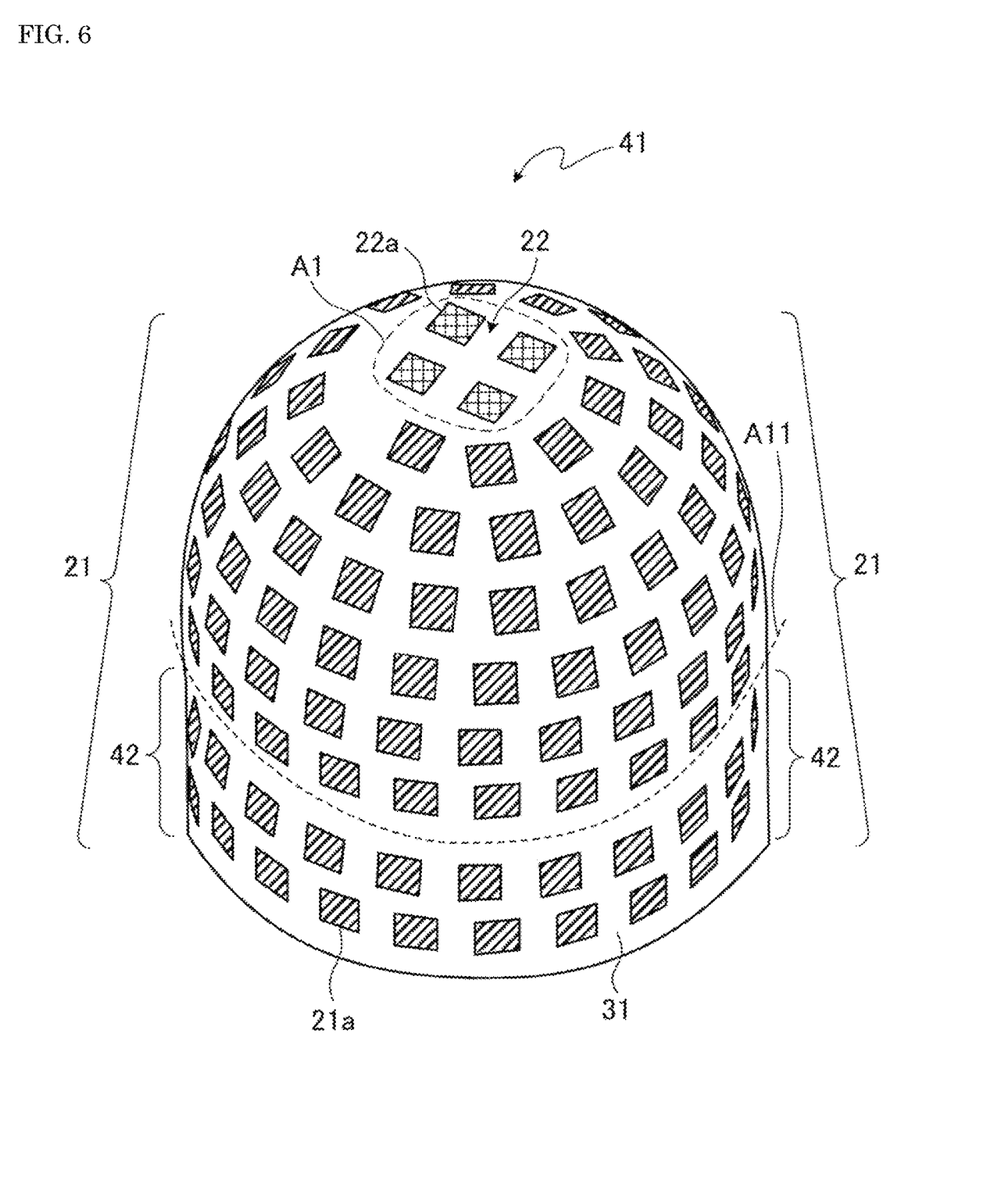
FIG. 6 is a perspective view showing one example of an antenna according to a second exemplary embodiment.

FIG. 6 is a perspective view showing one example of antenna 41 according to a second exemplary embodiment. In FIG. 6, identical reference numerals designate identical components to components in FIG. 4.

As shown in FIG. 6, a lower part of base 31 has a cylindrical shape. For example, base 31 below dotted line A11 in FIG. 6 has a columnar shape. That is, base 31 has a cylindrical shape, and has a hemispherical shape at one end of the cylindrical shape.

Antenna elements 21a of conformal array antenna 21 are also disposed in the cylindrical part of base 31. The cylindrical part of conformal array antenna 21 (part below dotted line A11 in FIG. 6) may be referred to as a cylinder array antenna.

Antenna elements 21a in cylinder array antenna 42 shown in FIG. 6 are disposed so as to be continuous with antenna elements 21a disposed in the hemispherical part of base 31. For example, antenna elements 21a on cylinder array antenna 42 are disposed based on the above generalized spiral series formula. Antenna elements 21a in cylinder array antenna 42 may be disposed at equal intervals in a cylindrical coordinate system.

As described above, conformal array antenna 21 (antenna 41) may partially include cylinder array antenna 42. This also allows communication apparatus 10 to properly communicate with a plurality of satellites.

For example, communication apparatus 10 compensates a decrease in an opening of antenna 41 even when the geostationary satellite is located in a direction at low elevation angle during a high-altitude travel of the aircraft because antenna 41 has cylinder array antenna 42.

Third Exemplary Embodiment

The antenna elements may be bullseye antenna elements having a concentric antenna structure.

Figure 7:
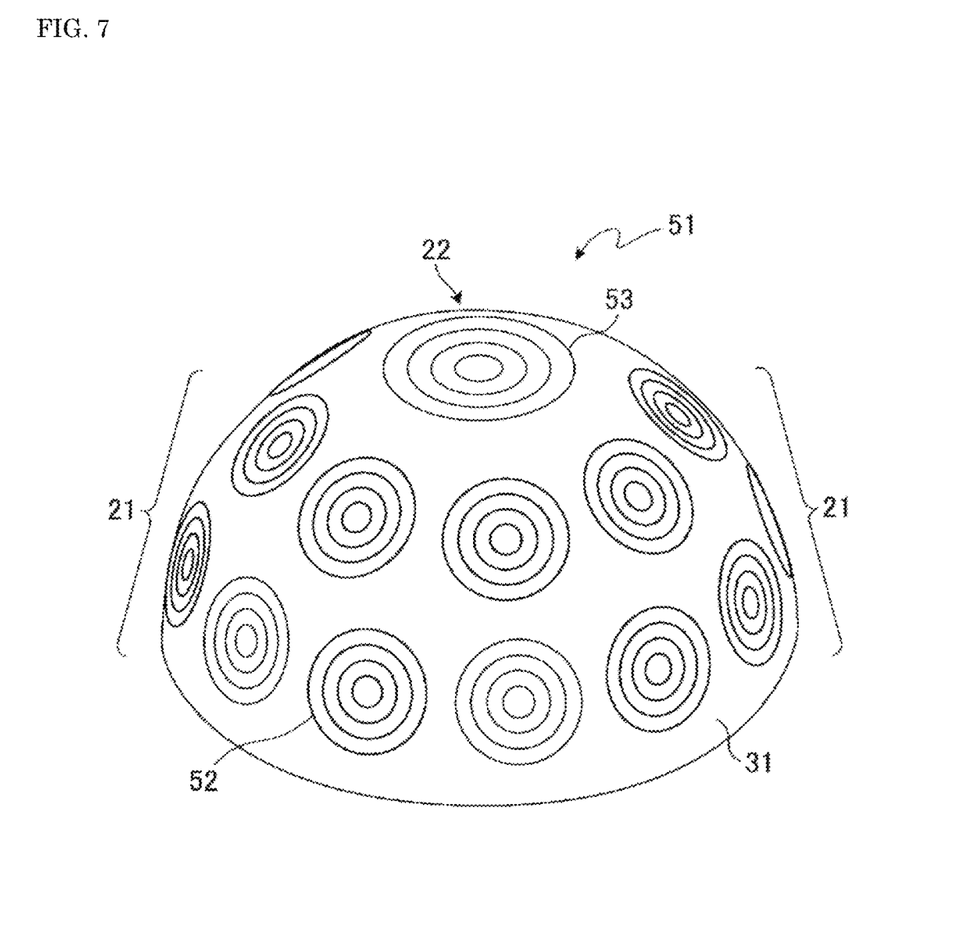
FIG. 7 is a perspective view showing one example of an antenna according to a third exemplary embodiment.

FIG. 7 is a perspective view showing one example of antenna 51 according to a third exemplary embodiment. In FIG. 7, identical reference numerals designate identical components to components in FIG. 4.

As shown in FIG. 7, conformal array antenna 21 of antenna 51 has a plurality of bullseye antenna elements 52. Bullseye antenna elements 52 may be disposed based on the above generalized spiral series formula.

Zenith array antenna 22 of antenna 51 has bullseye antenna element 53. In the example of FIG. 7, zenith array antenna 22 has one bullseye antenna element 53, but may have a plurality of bullseye antenna elements.

As described above, conformal array antenna 21 may have bullseye antenna elements 52. Zenith array antenna 22 may include bullseye antenna element 53. Bullseye antenna elements 52, 53 have higher directivity gain than patch antenna elements, and therefore communication apparatus 10 can form a beam with a smaller number of elements.

The bullseye antenna element may be applied to antenna 41 having cylinder array antenna 42 described in the second exemplary embodiment.

Fourth Exemplary Embodiment

The antenna may have soft boundaries.

Figure 8:
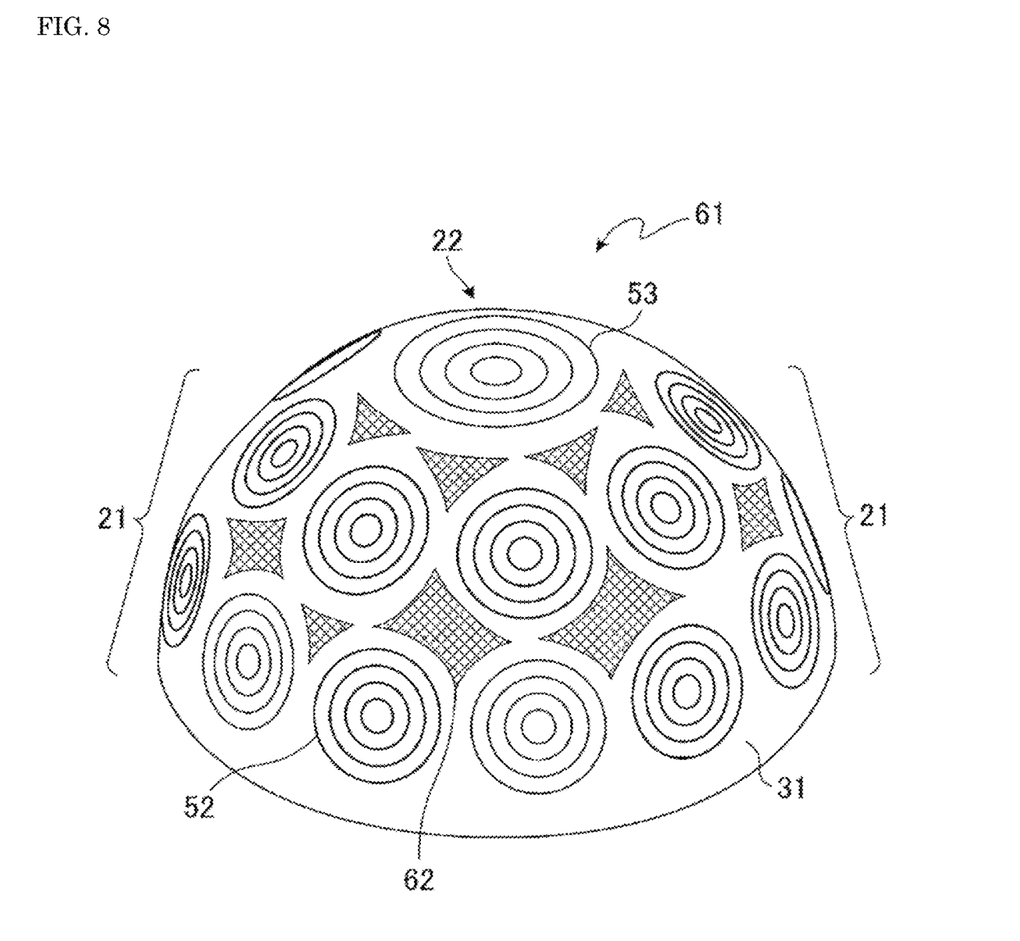
FIG. 8 is a perspective view showing one example of an antenna according to a fourth exemplary embodiment.

FIG. 8 is a perspective view showing one example of antenna 61 according to a fourth exemplary embodiment. In FIG. 8, identical reference numerals designate identical components to components in FIG. 7.

As shown in FIG. 8, antenna 61 has soft boundaries 62. Soft boundaries 62 are formed between bullseye antenna elements 52, 53 formed on the surface of base 31.

Soft boundaries 62 are configured by, for example, a corrugated structure including a plurality of grooves. A depth of the grooves of the corrugated structure is, for example, ¼ of a wavelength of an electromagnetic wave of the transmission signal or the reception signal.

As described above, antenna 61 may have the soft boundaries between bullseye antenna elements 52, 53. This suppresses interference between bullseye antenna elements 52, 53, and communication apparatus 10 can improve accuracy of beam formation.

Soft boundaries 62 are not limited to the corrugated structure. Soft boundaries 62 may have a structure having a function of adjusting a boundary impedance of antenna 61 with respect to the surface wave, for example. For example, soft boundary 62 may be formed on the surface of base 31 by a structure having a function of adjusting the boundary impedance such as a frequency selective boundary or a metamaterial.

Soft boundary 62 may be applied to antenna 11 described in the first exemplary embodiment and antenna 41 described in the second exemplary embodiment.

In the above exemplary embodiments, the notation "unit" used for each component may be replaced with another notation such as "circuit (circuitry)", "device", "unit", or "module".

Although the exemplary embodiments have been described with reference to the drawings, the present disclosure is not limited to the examples. It will be apparent to those skilled in the art that various changes and modifications can be made within the scope of the claims. It is understood that such changes or modifications also belong to the technical scope of the present disclosure. Further, the components in the exemplary embodiments may be arbitrarily combined without departing from the gist of the present disclosure.

The present disclosure can be achieved by software, hardware, or software linked with hardware. The functional blocks used for describing the exemplary embodiments are partially or wholly achieved as a large-scale integration (LSI) as an integrated circuit. Each process described in the exemplary embodiments may be partially or wholly controlled by one LSI or a combination of LSIs. The LSI may be configured by individual chips, or may be configured by one chip so as to include some or all of the functional blocks. The LSI may include data input and output. The LSI may be referred to as an IC, a system LSI, a super LSI, or an ultra LSI depending on an integration degree.

A method of circuit integration is not limited to the LSI, and may be achieved by a dedicated circuit, a general-purpose processor, or a dedicated processor. A field programmable gate array (FPGA) that can be programmed after the LSI is manufactured, or a reconfigurable processor that can reconfigure connection and setting of circuit cells inside the LSI may be used. The present disclosure may be implemented as digital processing or analog processing.

Further, if integrated circuit technology emerges to replace LSIs as a result of advancement of semiconductor technology or another derivative technology, the functional blocks may well be integrated using such a technology. An application of biotechnology or the like is possible.

The communication apparatus according to the present disclosure is not limited to being mounted on an aircraft, but can be applied to any flying body such as an unmanned aerial vehicle or a drone. Further, as long as the communication apparatus communicates with a satellite, the communication apparatus can be applied to a mobile body on the ground.

The communication apparatus according to the present disclosure has flexible tracking performance that corresponds to one or both of the altitude and the relative speed of a satellite, and is useful as a communication apparatus that provides, for example, an internet connection service in an aircraft. Further, the communication apparatus of the present disclosure can be applied to communication with a ground earth station.

What is claimed is:

1. A communication apparatus comprising:
an antenna including a base having a dome shape, a first antenna element disposed in a first region including a zenith of the base, and one or more second antenna elements disposed in a second region of the base; and
beam forming circuitry which, in operation, controls, based on position information of a target satellite to communicate with, a beam formation of the first antenna element and the one or more second antenna elements,
wherein the one or more second antenna elements include a plurality of second antenna elements, and the plurality of second antenna elements is disposed on a curved surface of the base having the dome shape based on a single generalized spiral sequence.

2. The communication apparatus according to claim 1, wherein the beam forming circuitry calculates a weight based on the position information of the target satellite, and multiplies, by the weight, a signal transmitted or received by each of the first antenna element and the one or more second antenna elements.

3. The communication apparatus according to claim 1, wherein
the beam forming circuitry forms a first beam when the target satellite to communicate with is a geostationary satellite, and
the beam forming circuitry forms a second beam having a beam width wider than a beam width of the first beam when the target satellite orbits in a lower orbit than an orbit of the geostationary satellite or when the target satellite orbits at a relative speed higher than or equal to a predetermined value with respect to the communication apparatus.

4. The communication apparatus according to claim 1, wherein each of the first antenna element and the one or more second antenna elements is a bullseye antenna element.

5. The communication apparatus according to claim 1, wherein the antenna has a soft boundary.

6. The communication apparatus according to claim 5, wherein the soft boundary has a corrugated structure.

7. The communication apparatus according to claim 6, wherein the soft boundary is configured by a metamaterial.

8. An antenna comprising:
a base having a dome shape;
a first antenna element disposed in a first region including a zenith of the base; and
one or more second antenna elements disposed in a second region of the base,
wherein the one or more second antenna elements include a plurality of second antenna elements, and the plurality of second antenna elements is disposed on a curved surface of the base having the dome shape based on a single generalized spiral sequence.

9. The communication apparatus according to claim 1, wherein each of the second antenna elements is disposed on the curved surface of the base based on the generalized spiral sequence in accordance with the following formula:

$$h_k = k - 1/N - 1$$

$$\theta_k = \mathrm{acos}(h_k)$$

$$h_k = \frac{k-1}{N-1}$$

$$\theta_k = \mathrm{acos}(h_k)$$

$$\phi_k = \phi_{k-1} + \sqrt{\frac{2\pi}{N}} \frac{1}{\sqrt{1-h_k^2}}$$

where
N represents the number of the second antenna elements,
θk represents a polar angle for k-th antenna element, and
φk represents an azimuthal angle for the k-th antenna element.

* * * * *